US008818795B1

(12) United States Patent  (10) Patent No.: US 8,818,795 B1
Cassimatis et al.  (45) Date of Patent: Aug. 26, 2014

(54) METHOD AND SYSTEM FOR USING NATURAL LANGUAGE TECHNIQUES TO PROCESS INPUTS

(71) Applicant: Yahoo! Inc., Sunnyvale, CA (US)

(72) Inventors: Nicholas Louis Cassimatis, Cohoes, NY (US); Richard Noel Caneba, Troy, NY (US); Jonathan Richard Scally, Albany, NY (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/949,886

(22) Filed: Jul. 24, 2013

Related U.S. Application Data

(60) Provisional application No. 61/781,237, filed on Mar. 14, 2013.

(51) Int. Cl.
  *G06F 17/27* (2006.01)
(52) U.S. Cl.
  USPC .......................................................... 704/9
(58) Field of Classification Search
  None
  See application file for complete search history.

(56) References Cited

U.S. PATENT DOCUMENTS

| | | | |
|---|---|---|---|
| 6,839,669 B1 * | 1/2005 | Gould et al. ................... | 704/246 |
| 6,950,793 B2 * | 9/2005 | Ross et al. ......................... | 704/9 |
| 7,127,402 B2 * | 10/2006 | Ross et al. ..................... | 704/275 |
| 7,249,018 B2 * | 7/2007 | Ross et al. ..................... | 704/257 |
| 7,302,383 B2 * | 11/2007 | Valles ............................... | 704/9 |
| 7,587,308 B2 * | 9/2009 | Kasravi et al. ..................... | 704/9 |
| 8,180,629 B2 * | 5/2012 | Rehberg ............................ | 704/9 |
| 2009/0012842 A1 * | 1/2009 | Srinivasan et al. ............... | 705/10 |
| 2009/0119095 A1 * | 5/2009 | Beggelman et al. ............... | 704/9 |
| 2010/0057463 A1 * | 3/2010 | Weng et al. ..................... | 704/257 |
| 2012/0016678 A1 * | 1/2012 | Gruber et al. .................. | 704/275 |

* cited by examiner

*Primary Examiner* — Brian Albertalli
(74) *Attorney, Agent, or Firm* — Berkeley Law & Technology Group, LLP

(57) ABSTRACT

Systems and methods are provided for utilizing natural language to process queries. The method for analyzing a linguistic input may include receiving the linguistic input, the linguistic input including at least one word, accessing prestored language data for a language corresponding to the linguistic input, converting the linguistic input into a text-possibility representations based on the received language data, determining a meaning of the text possibility based on the prestored language data, generating at least one semantic structure corresponding to the determined meaning, and determining an action to perform based on the generated at least one semantic structure. The prestored language data may be converted from multiple formats into one or more formats that can be algorithmically processed by a computational device.

29 Claims, 10 Drawing Sheets

METHOD AND SYSTEM FOR USING NATURAL LANGUAGE TECHNIQUES TO PROCESS INPUTS

CROSS-REFERENCE

This Application claims the benefit of U.S. Provisional Application No. 61/781,237 filed on Mar. 14, 2013, the entire contents of which is herein incorporated by reference.

TECHNICAL FIELD

Embodiments of the disclosure generally relate to utilizing natural language to interact with software and devices.

BACKGROUND

Processing of natural language to perform tasks or processes has become a valuable aspect of many devices. For example, processing a natural language input such as "call John Doe" to place a telephone call. However, traditional methods for processing natural language to perform tasks require that a developer input the possible language patterns before any processing can be performed, and/or they require inducing such patterns from past input. Unfortunately, the number of patterns of language input is for many tasks too great to be feasibly entered, even by very large teams of developers. Likewise, even enormous amounts of past input are often likely not sufficient for computational systems to determine how to appropriately deal with new inputs. Accordingly, traditional methods result in computational systems that understand extremely narrow, brief, and/or limited language, often with poor levels of precision.

SUMMARY

These and other capabilities of the disclosed subject matter will be more fully understood after a review of the following figures, detailed description, and claims. It is to be understood that the phraseology and terminology employed herein are for the purpose of description and should not be regarded as limiting.

In one aspect, the present disclosure relates to a method for analyzing a linguistic input can include receiving the linguistic input, the linguistic input comprising at least one word; accessing prestored language data for a language corresponding to the linguistic input; converting the linguistic input into a text-possibility representations based on the received language data; determining a meaning of the text possibility based on the prestored language data; generating at least one semantic structure corresponding to the determined meaning; and determining an action to perform based on the generated at least one semantic structure.

In some embodiments, the prestored language data can include language constructions and lexemes.

In some embodiments, the language constructions and lexemes can associate text patterns with corresponding meanings.

In some embodiments, converting the linguistic input into the text possibility can include determining whether the linguistic input is ambiguous based on the prestored language data.

In some embodiments, the method can further include receiving a user input; and converting the user input into the linguistic input such that the linguistic input is converted into the text possibility based on at least one of handwriting recognition, speech recognition, optical character recognition, and a gesture based user interface.

In some embodiments, determining the meaning of the text possibility can include selecting a subset of the text possibility; generating at least one new language construction and at least one new lexeme based on the subset of the text possibility; identifying a known language construction that matches the at least one new language construction; combining the known language construction that matches the subset of the text possibility with another language construction to generate a meaning possibility; generating a semantic structure for the meaning possibility of the text possibility; modifying the semantic structure for the meaning possibility based on the prestored language data; and determining the action to perform based on the modified semantic structure for the meaning possibility.

In some embodiments, generating at least one new language construction can be based on common linguistic properties included in the prestored language data.

In some embodiments, identifying the known language construction that matches the at least one new language construction can be based on the common linguistic properties.

In some embodiments, generating the meaning possibility can include identifying a grammatical form of the subset.

In some embodiments, generating the meaning possibility can include determining whether the subset is ambiguous and removing the ambiguity based on at least one of known language semantics, language statistics, and language taxonomy.

In some embodiments, the ambiguity can be related to at least one of the grammatical form of the subset, a phrase attachment to the subset, a semantic type of the subset, and a pronoun binding in the subset.

In some embodiments, grammatical form can include at least one of a word type and a phrase type that is constrained in at least one of a grammatical category, semantic category, morphological structure, and phonological structure of input.

In some embodiments, generating the meaning possibility can be based on at least one of the combined language constructions, a pronoun binding in the subset, a conjunction in the subset, and an ellipsis in the subset.

In some embodiments, the subset can include at least one word.

In some embodiments, the linguistic input can include an input convertible to text including one of a textual input, handwritten, gestural, and a spoken input.

In some embodiments, the prestored language data can include at least one of word semantics, phrase semantics, linguistic statistics, world knowledge, and linguistic taxonomy.

In some embodiments, the determined action can be at least one of performing an internet search, composing a message, creating a contact, interacting with software, manipulating, retrieving or storing data producing computer code, interacting with software through APIs, querying or modifying one or more databases, and placing a telephone call.

In some embodiments, the linguistic input can be received from a device and the determined action is performed at the device, or a separate device.

Another aspect of the present disclosure relates to at least one non-transitory processor readable storage medium storing a computer program of instructions configured to be readable by at least one processor for instructing the at least one processor to execute a computer process for performing a method for analyzing a linguistic input that can include receiving the linguistic input, the linguistic input comprising at least one word; accessing prestored language data for a language corresponding to the linguistic input; converting the linguistic input into a text-possibility representations based on the received language data; determining a meaning of the text possibility based on the prestored language data; generating at least one semantic structure corresponding to the determined meaning; and determining an action to perform based on the generated at least one semantic structure.

Another aspect of the present disclosure relates to a method for analyzing a linguistic input that can include accessing prestored data, the prestored data including a plurality of prestored data containing at least one of language constructions, lexemes, world knowledge, statistical regularities, and contextual information; generating a new language construction and lexeme based on the prestored data; generating an additional language construction and lexeme based on a combination of prior language constructions and lexemes; converting the prestored data into a different format; receiving the linguistic input, the linguistic input including at least one word; converting the linguistic input into a text possibility based on the converted prestored data including the new and additional language constructions and lexemes; determining a meaning of the text possibility based on the converted prestored data; generating at least one semantic structure corresponding to the determined meaning; and determining an action to perform based on the generated at least one semantic structure.

In some embodiments, each of the language constructions and lexemes can include at least one word type paired with a semantic structure, the word type including at least one of syntactic and semantic information.

In some embodiments, the prestored data can include at least one of categories of linguistic and nonlinguistic data, word associations, world knowledge, linguistic knowledge, statistical regularities, and an analog signal to text-possibility representation conversion module.

In some embodiments, generating the new language construction and lexeme can include selecting one of the plurality of prestored language constructions and/or lexemes; determining a syntactic form of the selected construction; generating a new syntactic form based on the form of the selected construction; and generating a new semantic structure based on the selected construction and the generated syntactic form In some embodiments, the syntactic form of the selected constructions or lexemes can include at least one of a word type and a phrase type that is constrained in at least one of a grammatical category, semantic category, morphological structure, and phonological structure of input.

In some embodiments, generating the new language construction can further include generating a semantic representation for the generated syntactic form; and combining the generated new syntactic form and the semantic representation to form the new language construction.

In some embodiments, generating the additional language construction can be based on a determination of whether one or more prior language constructions or lexemes together match one of the plurality of prestored language constructions and lexemes.

In some embodiments, determining a possible syntactic structure and semantic structure of the linguistic input can be based on a computational process utilizing an interrelationship between the prestored language constructions, lexemes, world knowledge, statistical regularities, and contextual information.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The present disclosure is generally directed to a computational system for utilizing linguistic and contextual knowledge to perform a particular function in accordance with an input (e.g., a spoken natural language input). For example, the input may be a request to perform an internet search, place a telephone call, book a hotel, find/retrieve/insert/manipulate data into a database, send a message, or search for flights. To determine which action or function to perform, the input may be analyzed to determine whether there are multiple interpretations (e.g., "the bug") and then variations of the interpretations may be generated based on linguistic knowledge. In addition, a corresponding meaning of the interpretations (e.g., surveillance device v. insect) may also be determined based on the linguistic and contextual knowledge, and then the most appropriate action or function to perform may be selected based on the meaning that most appropriately corresponds to the input. A system with these capabilities may be generated with the aid of a compiler that takes linguistic and contextual information and converts it into a form that can be used to understand the meanings of utterances. For example, the compiler may be given information that includes parings of input patterns (e.g. "PERSON devoured FOOD") with a representation of their meaning (e.g., "Past(Eat(PERSON, FOOD))." These pairings, together with other forms of knowledge can be converted into machine-readable knowledge (e.g., logical formulas or Bayesian networks) that are used by an input analyzer to infer the meaning and perform the actions the user intended.

Figure 1:
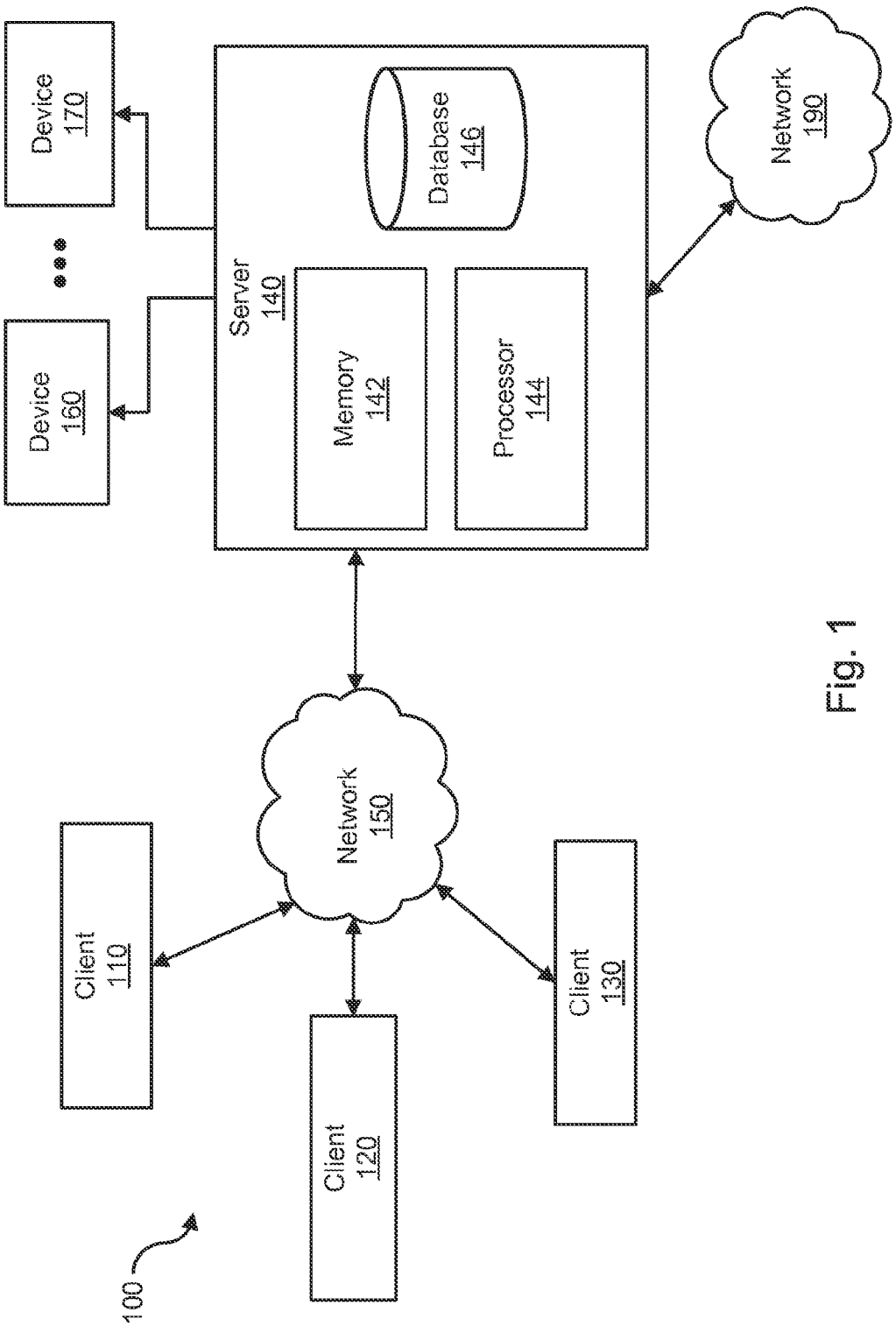
FIG. 1 is an exemplary diagram of a network architecture in accordance with some embodiments of the present disclosure.

FIG. 1 is an exemplary diagram of a system 100 in accordance with some embodiments. The system 100 includes remote clients 110, 120, and 130. The clients may be in communication with a server 140 through a communication network 150. Server 140 may include a database 146 configured to centrally store relevant language knowledge. Server 104 may also include a processor 144 in communication with database 146 and memory 142. Processor 144 is configured to run modules stored in memory 142 (and/or database 146) that are configured to cause the processor to perform computerized functions, further described herein. System 100 may further include devices 160-170 in communication with server 140. In addition, server 140 may be in communication with a separate network 190.

Clients 110, 120, and 130 can be any appropriate computing device, for example, cell phones, PDAs, smartphones, laptops, tablets, automobile computers, personal computers, and/or any other type of computing device. Clients 110, 120, and 130 can receive input from a user, store the input from a user, and transmit the input to server 140. In some embodiments, clients 110-130 may be capable of performing a task or process in response to processing and analyzing of a natural language input from a user.

Referring to server 140, server 140 may be an application server, an archival platform, a backup server, a network storage device, a database, a media server, an email server, a natural language processing platform, an enterprise search server, or other devices communicatively coupled to network 150. Server 140 may be a host, such as a natural language processing platform, which may process data traveling between clients 110, 120, and 130.

Communication network 150 can include a network or combination of networks that can accommodate private data communication. For example, communication network 106 can include a local area network (LAN), a private cellular network, a private telephone network, a private computer network, a private packet switching network, a private line switching network, a private wide area network (WAN), or any number of private networks that can be referred to as an Intranet. Such networks may be implemented with any number of hardware and software components, transmission media and network protocols. FIG. 1 shows network 150 as a single network; however, network 150 can include multiple interconnected networks listed above.

One or more processors 144 can be configured to implement the functionality described herein using computer executable instructions stored in a temporary and/or permanent non-transitory memory such as memory 142. Memory 142 can be flash memory, a magnetic disk drive, an optical drive, a programmable read-only memory (PROM), a read-only memory (ROM), or any other memory or combination of memories. Processor 144 may be a central processing unit and/or may also be implemented using an application specific integrated circuit (ASIC), programmable logic array (PLA), field programmable gate array (FPGA), graphical programming unit (GPU), specialty-purpose program and/or any other integrated circuit. Similarly, database 146 may also be flash memory, a magnetic disk drive, an optical drive, a programmable read-only memory (PROM), a read-only memory (ROM), or any other memory or combination of memories. Clients 120 and devices 160-170 can execute an operating system that can be any appropriate computer operating system.

The components of system 100 can include interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, for example optical, copper, and wireless, and in a number of different protocols some of which may be non-transient.

In some embodiments, server 140 can reside in a data center and form a node in a cloud computing infrastructure. Server 140 can also provide services on demand such as web services and any other on demand service. Server 140 in the cloud can be managed using a management system. Further, server 140 may be virtualized in a multi-node clouding computing environment and processes performed by server 140 may be implemented across multiple physical and/or virtual computing units.

Figure 2:
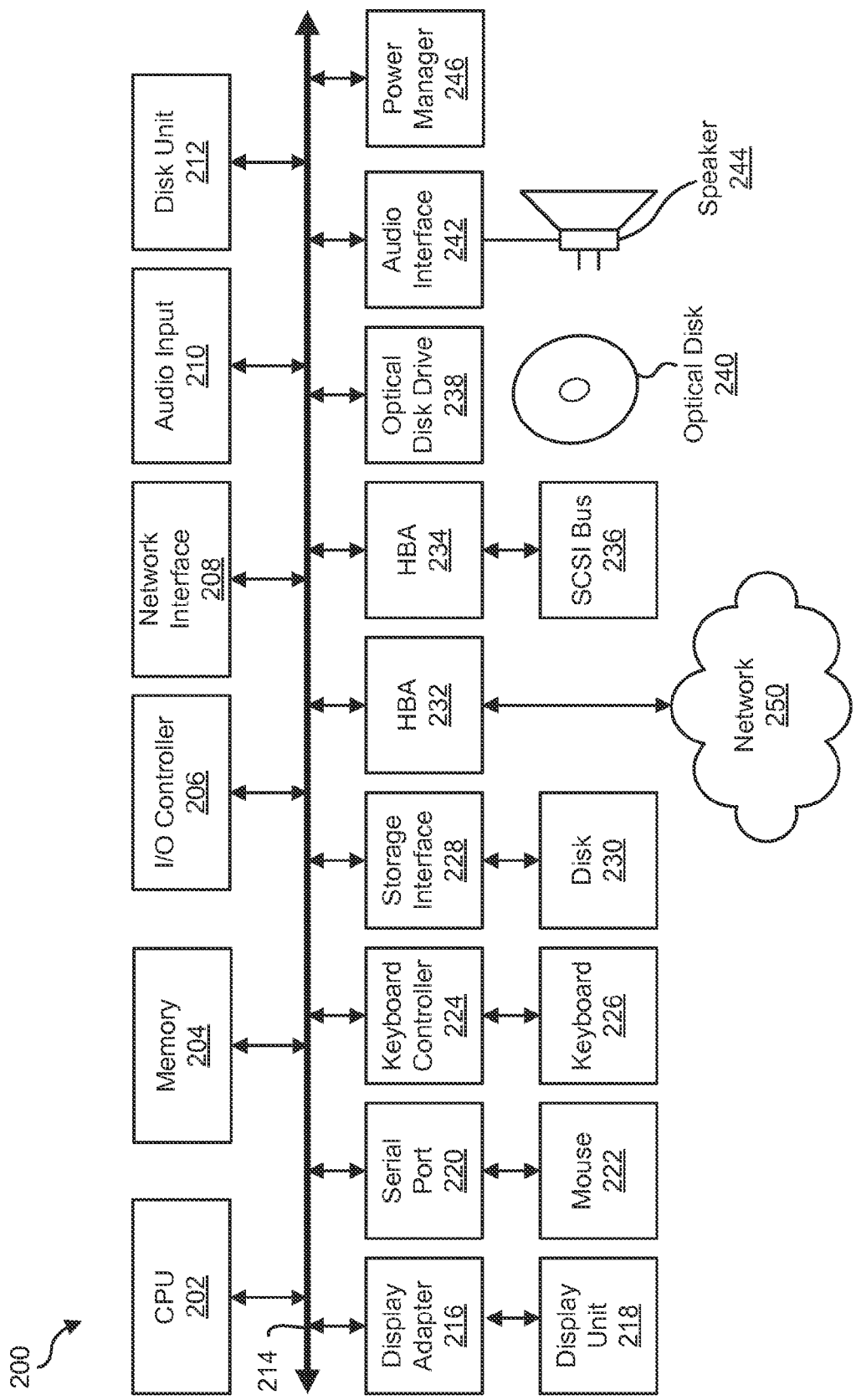
FIG. 2 is an exemplary diagram of a computer system in accordance with some embodiments of the present disclosure.

FIG. 2 is an exemplary diagram 200 of a computer system 200 in accordance with some embodiments of the present disclosure.

Computer system 200 is suitable for implementing the present disclosure. Computer system 200 may include a bus 214 which may interconnect major subsystems of the computer system 200. The computer system 200 may also include at least one central processing unit (CPU) and/or at least one graphical processing unit (GPU) 202, a memory 204 (e.g., random access memory (RAM), read only memory (ROM), flash RAM, or any other appropriate memory), an input/output (I/O) controller 206, a network interface 208, an audio input 210 (e.g., a microphone), and a disk unit 212 (e.g., hard drive). The computer system 200 may further include a display adapter 216 in communication with a display unit 218, a serial port 220 in communication with a mouse 222, a keyboard controller in communication with a keyboard 226, and a storage interface 228 in communication with a disk 230.

The computer system 200 may further include a host bus adapter (HBA) interface 232 in communication with a network 250, a host bus adapter (HBA) interface 234 in communication with a SCSI bus 236, an optical disk drive 238 configured to read and write to an optical disk 240, an audio interface 242 in communication with a speaker 244, and a power manager 246. The bus 214 provides data communication between any of the above-noted elements.

Figure 3:
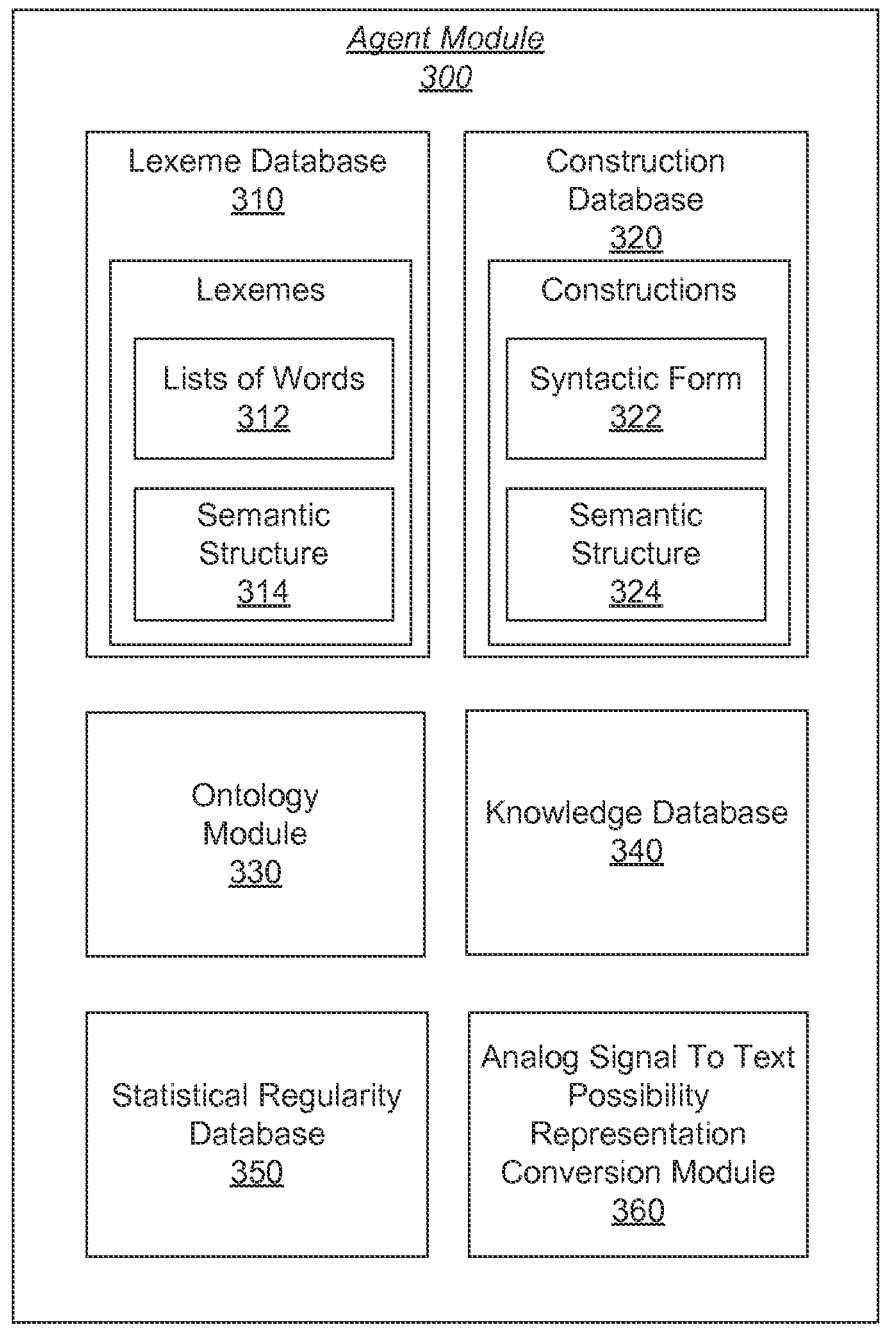
FIG. 3 is an exemplary diagram of an agent module in accordance with some embodiments of the present disclosure.

FIG. 3 shows an agent module 300 in accordance with an embodiment of the present disclosure. In general, agent module 300 maintains, stores, and updates knowledge of language to be used when analyzing natural language inputs (e.g., words, phrases, sentences, etc.). As illustrated, agent module 300 may contain one or more components including a lexeme database 310, a construction database 320, an ontology module 330, a knowledge database 340, a statistical regularity database 350, and an analog signal to text-possibility representation conversion module 360. The analog signal may include pen, voice, gesture or other forms of input.

Lexeme database 310 may include a plurality of lexemes. A lexeme may be an item in the vocabulary of a language. For example, a lexeme may have a syntactic form that is a word such as "eat" or "run." The database 310 may also contain lexemes whose syntactic structure is a list of words 312 and corresponding semantic structures 314 for the lexemes. The lexemes associate text patterns (e.g., syntactic forms) with their corresponding meanings (e.g., semantic structures). In one example, a lexeme included in the list of words 312 may have a syntactic form of "bob" and "robert" and the associated semantic structure 314 may be PERSON(bob) and PERSON(robert). Accordingly, the words "bob" and "robert" may be in a category of PERSON.

In another example, a lexeme included in the list of words 312 may have a syntactic form of "pizza" and the associated semantic structure 314 may be FOOD(pizza). That is, the word "pizza" may be of a category FOOD. The word "eat" may also be included in the list of words 312 and have an associated semantic structure 314 of EATING-EVENT(eat). Further, the word "devour" may be in the list of words 312 and have an associated semantic structure 314 of DEVOUR-EVENT(devour).

The syntactic form of both lexemes and constructions may be represented in various ways, including but not limited to: lists of words, lattices, or other graph structures. The syntactic form may include (potentially typed) variables. For example, the form "X-NP ordered Y-NP" may be used to capture patterns of word occurrences where the word "ordered" is preceded by a noun phrase and followed by one as well. The types may be partially semantic as well. For example, the form "DOG-NP bite PHYSICAL-OBJECT-NP" may be used to capture patterns where the subject of the word "bite" is a noun phrase that refers to something that is a dog and the object is a noun phrase that refers to a physical object. Semantic structures of lexemes and constructions may be indicated using many data structures or notations. For example, these may include (in addition to others not mentioned here) predicate logic, JSON (JavaScript object description language), XML, linear algebraic structures, associations with elements of databases (such as rows, columns, or tables), etc.

The construction database 320 may include a plurality of constructions. Constructions may be patterns of words, phrases or other utterances paired together with a semantic structure that is associated with those patterns. A "semantic structure" may be machine-readable knowledge that encodes the (potential) meaning of a linguistic utterance. A construction may also include a syntactic form that is unitary (e.g., eat) or may be a plurality of elements forming a phrase pattern or sentence pattern. The database 310 may contain syntactic forms 322 and corresponding semantic structures 324 for the constructions. In one example, a syntactic form 322 may be "PERSON ate FOOD" and the associated semantic structure 324 may be "InThePast(Ate(PERSON,FOOD))."

The ontology module 330 may store information regarding the semantic structures stored in the lexeme database 310 and the construction database 320. The ontology module may also include information about how categories of entities relate to each other. For example, category PENGUIN may be a subcategory of BIRD, and BIRD may be a subcategory of ANIMAL. The ontology module may also include information indicating that certain categories of objects are associated with certain properties. For example, mammals have mothers and plants do not. In addition, the categories in a hierarchy may be organized in a multiple-inheritance hierarchy (e.g., the category BIRD may be a subcategory both of ANIMAL and of FLYING-OBJECT).

The knowledge database 340 also may store relevant information about the data stored in the lexeme database 310 and the construction database 320. For example, the knowledge database 340 may store information indicating that "if X performs FOOD-CONSUMPTION-EVENT, then X is an animal." Knowledge may be stored using multiple forms of data structures. For example, the knowledge may be stored in the knowledge database 340 as predicate calculus, weighted or probabilistic constraints, scripts, frames, schemas, graphical structures, conditional probability tables, correlation matrices and object-oriented data structures.

The statistical regularity database 350 may also store relevant information used to analyze user inputs. For example, the statistical regularity database 350 may store information about the co-occurrence of properties in the world, e.g., that "dogs tend not to eat pizza" and "pizza tends to include tomato sauce." The statistical regularity database 350 may also store user preferences, relationships between people, the history of the actions of people and devices, and generally anything pertaining to facts or regularities about the internal or external world. In addition, the statistical regularity database 350 may include information about the category, occurrence, and co-occurrence of linguistic items. For example, the word "bug" spoken soon after the word "spy" tends to indicate a listening device rather than an insect.

The statistical regularity database 350 may further store information that pertains to the identity of elided elements, the reference of pronouns and other referring expressions, the categories of words, and the relationships between syntactic constituents. Additionally, information pertaining to relationships between linguistic and non-linguistic information may be included. For example, "the word 'bug' uttered by someone who is a spy tends to refer to a listening device." These tendencies may be represented with numerical, qualitative or other forms of notation indicating statistical or probabilistic relationships. The regularities can be stored using many data structures, including, but not limited to, graphical models, correlation matrices, Dempster-Shafer calculus notation, weighted or probabilistic propositional or first-order constraints. The statistical regularities may also be captured by encoding the original data from which the regularities may be inferred.

The analog signal to text-possibility representation conversion module 360 may convert a user input into a test-possibility representation. For example, the module 360 may be configured to optically recognize characters (OCR), to recognize gestures, to recognize speech, or to recognize handwriting. In another example, the module 360 may receive an analog signal via a keyboard or mouse and convert that signal or input into a text possibility. That is, the module 360 may receive a plurality of characters entered by a user via a keyboard, microphone, scanner, a video camera or any device that collects analog, digital and/or network-accessible information and convert that to a text-possibility representation. This module may employ information from other components of the agent module (FIG. 3) to infer these text possibilities. In addition, the text-possibility representation may encode the various possible text forms of the linguistic input. For example, a person may utter a sentence and a speech recognition system may not be able to infer whether the person meant to say "I like pizza" or "I like pizzas." Accordingly, the text-possibility representation may indicate that the user may have meant to say either of these two sentences.

Each of the above-noted modules may be utilized during different portions of the processes described below. For example, the analog signal to text-possibility representation conversion module 360 may receive and process the user input at step 404 of FIG. 4. In addition, the lexeme database 310, the construction database 320, the ontology module 330, the knowledge database 340, and the statistical regulatory database 350 may be utilized in steps 406, 408, and 410 of FIG. 4 to analyze and convert the text-possibility representation and to determine the appropriate action.

Figure 4:
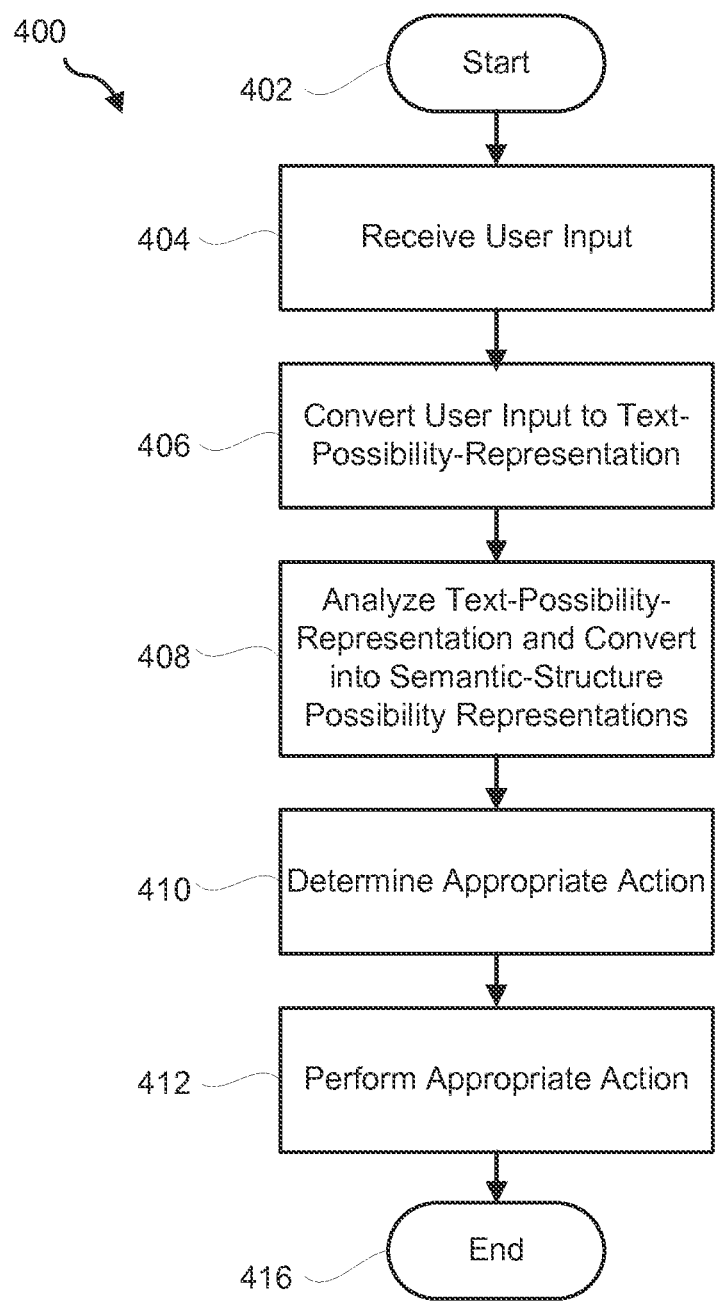
FIG. 4 is an exemplary diagram of a method for processing natural language in accordance with some embodiments of the present disclosure.

FIG. 4 is an exemplary diagram of a method 400 for processing a natural language input to perform an appropriate action in accordance with some embodiments of the present disclosure. At step 402, the process may begin. At step 404, a user input (e.g., text, audio, etc.) may be received. At step 406, the user input may be converted into a text-possibility representation. At step 408, the text-possibility representation may be converted into a semantic-structure possibility representation. At step 410, an appropriate action may be determined based on the semantic-structure possibility representation. At step 412, the appropriate action may be performed and the process may end at step 416.

Referring to step 404, a user input may be received. In some embodiments, the user input may be received at client 110-130. For example, client 110 may be a phone configured to receive a user input (e.g., a text input or an audio input). In the instance that the client 110 receives the user input, the user input may be transmitted to a server (e.g., server 140) for processing. The user input may be in any one of a plurality of appropriate forms. For example, the user input may be an audible sound such as spoken words or the user input may be a text input via a keyboard. In one example, the user input may include "Which pizza did Bob eat?" After the user input has been received, the process may proceed to step 406.

Referring to step 406, the user input received at step 404 may be converted into a text-possibility representation. In some embodiments, a speech recognizer or a speech recognition software may analyze the user input to determine that the user input could have multiple semantic structures. For example, the analog to signal to text-possibility representation conversion module 360 may convert the user input into the text-possibility representation. In addition, the user input may be converted into a plurality of text possibilities when the user input is ambiguous or may have more than one interpretation. In the above noted example, it may be determined that the user input could have been "pizza eaten by Bob" and "pizzas eaten by Bob." After the user input has been converted to text-possibility representations, the process may proceed to step 408.

Referring to step 408, the text-possibility representation generated at step 406 may be converted into a semantic-structure possibility representation. In the above noted example, the text-possibility representation (e.g., "pizza eaten by Bob") may be converted into a semantic-structure possibility including find(x), pizza(x), and ate(Bob,x). After the text-possibility representation has been analyzed and converted into the semantic-structure possibility representation, the process may proceed to step 410. In another example, if the user says "Mary saw the man with the telescope," she may have meant that Mary used the telescope to see the man or that Mary saw a man who possessed a telescope. The semantic-structure possibility may simply be a set of semantic structures, or it may be a more complex representation of semantic structure possibilities.

Additionally, the text-possibility representations and semantic-structure possibility representations may be stored for use in a later analysis of a user input. For example, the semantic structure resulting from the input "John met Mary" may be used to infer during the analysis of "he liked her" that "he" refers to "John." In some embodiments, the semantic and syntactic structures inferred can be converted into machine-readable knowledge and be stored in the knowledge database 1040 shown in FIG. 10.

Referring to step 410, it may be determined which appropriate action is to be performed according to the user input. The appropriate action may be determined based on the semantic-structure possibility representation generated from the user input. In the above noted example, it may be determined that the user wants to find "pizza eaten by Bob" in a restaurant database. Other types of actions can include, performing a database query, inserting information into a database, manipulating database information, converting natural language expressions into machine-readable forms, sending messages, performing calls to application programming interfaces, navigating to URLs, performing advanced searches, and generating computer code. After the appropriate action has been determined, the process may proceed to step 412.

Referring to step 412, the appropriate action determined at step 410 may be performed. In the above noted example, a restaurant database may be queried and based on the query, a list of restaurants where Bob ate pizza may be displayed to the user. After the determined action has been performed the process may proceed to step 416. At step 416, the system may proceed back to step 402 and await reception of another input.

Figure 5:
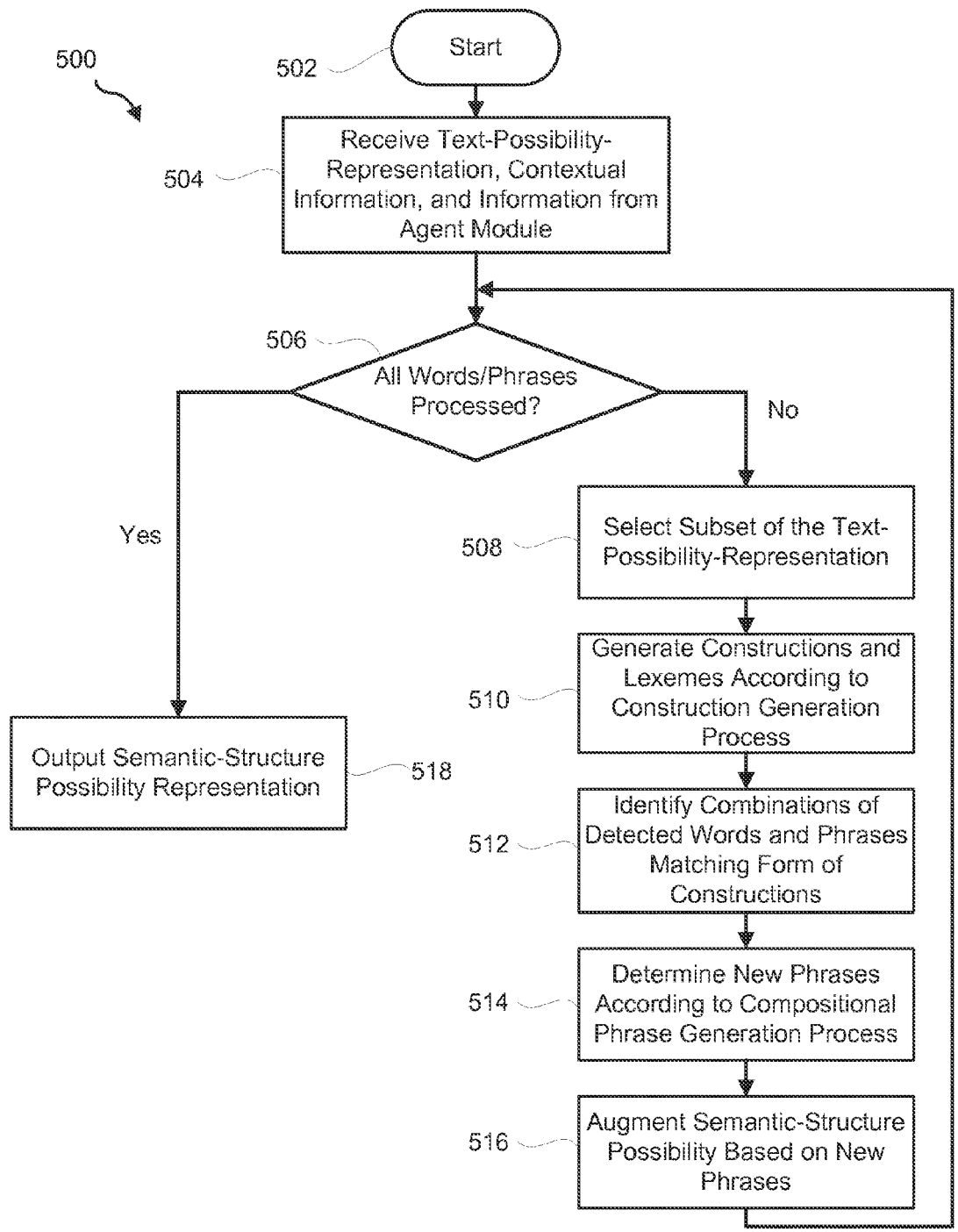
FIG. 5 is an exemplary diagram of a method for analyzing a natural language input in accordance with some embodiments of the present disclosure.

FIG. 5 is an exemplary diagram of a method 408 for analyzing the text-possibility representation and converting it into at least one semantic-structure possibility representation. At step 502, the process may begin. At step 504, the text-possibility representation, contextual information, and information from databases may be received. At step 506, it may be determined whether all of the words/phrases in the text-possibility representation have been processed. If it is determined at step 506 that all of the words/phrases have not been processed, the method may proceed to step 508. At step 508, a subset of the text-possibility representation may be selected. At step 510, a construction may be generated based on the subset of the text-possibility representation according to a construction generation process. At step 512, combinations of detected words and phrases that match a form of a construction be identified. At step 514, new phrases may be determined according to a compositional phrase generation process. At step 516, the semantic-structure possibility representation may be augmented based on the new phrases and the process may proceed back to step 512. If it is determined at step 506, that all of the words/phrases have been processed, the process may proceed to step 518. At step 518, a semantic-structure possibility representation may be output.

Referring to step 504, the text-possibility representation generated at block 406 may be received along with contextual information and information from agent module 300. The contextual information may include a location and identity of the user, a date, prior interactions with the user, and anything else about the user, the system and/or past, future, intended, believed, hypothetical or counterfactual states of the world that may be relevant to interpreting the user's input. In some embodiments, a plurality of text-possibility representations may be generated at block 406 from the user input. In some instances, the information at this step may have been generated by the compiling process shown in FIG. 6. In one example, the text-possibility representation may be "pizza that Bob devoured." After the information has been received at step 504, the process may proceed to step 506.

Referring to step 506, it may be determined whether each of the words or phrases of the text-possibility representations have been processed. In some embodiments, the text-possibility representation generated from the user input may have a plurality of words and phrases. In addition, multiple text-possibility representations may have been generated from the user input. In at least one embodiment, each of the words and phrases within the text-possibility representation may be processed sequentially or concurrently. If it has been determined that all of the words and/or phrases within any of the text-possibility representations have not been processed, the method may proceed to step 508. However, if it is determined that all of the words and/or phrases within all of the text-possibility representations have been processed, the method may proceed to step 518.

Referring to step 508, a subset of the at least one text-possibility received at step 504 may be selected. In some embodiments, the subset selected may be a word, a plurality of words, a phrase, a plurality of phrases, or the entire text-possibility representation. Additionally, the subset selected may be one that has not yet been processed or analyzed. In the above-noted example, the word "devoured" may be selected as the subset of the text-possibility representation. After the subset of the at least one text-possibility received has been selected, the process may proceed to step 510.

Referring to step 510, at least one construction may be generated for the selected subset. For the above-noted example, the agent module may only include a construction for the word devour. In this step, new constructions for the word "devoured" may be generated. The construction may include a semantic structure related to the semantic structure of the original construction. In this example, the semantic structure could add information that the devouring information occurred in the past. The process of generating the constructions is described in further detail below with respect to FIG. 7. New constructions generated at this step may be converted into machine-readable knowledge according to the method in 600. This machine-readable knowledge may then be used in the remaining processing for method 500. After the new constructions have been generated the process may proceed to step 512.

Referring to step 512, combinations of detected words and/or phrases that match a form of known constructions may be identified. In the above-noted example, the entire text-possibility representation "pizza that Bob devoured" may be selected at step 508, constructions may be generated at step 510, and at step 512 it may be determined that the subset matches a known construction "FOOD that PERSON devoured." In some embodiments, the match may be inexact and rely on equivalences between syntactic forms that comprise part of the knowledge of a language. In one example, the input may be "Bob sent an email to John" and a stored construction may be, "PERSON1 sent PERSON2 ITEM." In this case, although the match between the form of the construction and the linguistic input is not perfect, the match may nevertheless be identified at this step in accordance with the principles of English grammar permitting the phrase "X sent Y to Z" to be used in many cases interchangeably with "X sent Z to Y." In some cases, these matches may be permitted by the correspondences of syntactic forms due to tense (e.g., bake/baked), number (baker, bakers), derivational inflections (bake, baker, baking), etc. After step 512 has been performed, the process may proceed to step 514.

Referring to step 514, new phrases may be determined according to a compositional phrase generation process. In some embodiments, the new phrases may be noun or verb phrases that are comprised of the word and/or phrase of the text-possibility representation. For example, verb phrases that include the words "pizza that Bob devoured" may be determined. The compositional phrase generation process is described in further detail below with respect to FIG. 8. After the compositional phrase generation process has been performed, the process may proceed to step 518.

Referring to step 516, a semantic-structure possibility representation may be augmented based on the new phrases generated at step 514. In some embodiments, the semantic-structure possibility representation may be augmented according to a compositional meaning construction process. For example, "pizza" may be substituted for "FOOD" and "Bob" may be substituted for "PERSON" in a "devoured" construction to generate a semantic structure representation "Eat(Bob,pizza)." The compositional meaning construction process is described in further detail below with respect to FIG. 9. In some embodiments, the semantic-structure possibility may be augmented using inferences that take context and information from the agent module into account. In one example, an input about a flight (e.g., "find me flights to London") may have the semantic structure representing flights that may have information about the origin of the flight added to it by inferring that the origin of the flight is the airport nearest to the user's current location. In other examples, the semantic structure may be augmented by information in the lexemes and constructions, world knowledge, statistical regularities, the user state and preferences, and historical information. After the compositional phrase generation process has been performed, the process may proceed to step 516.

Referring to step 518, a semantic structure representation may be output. In some embodiments, multiple semantic structure representations may be output based on the processing of all of the words and/or phrases within the at least one text-possibility representation.

Figure 6:
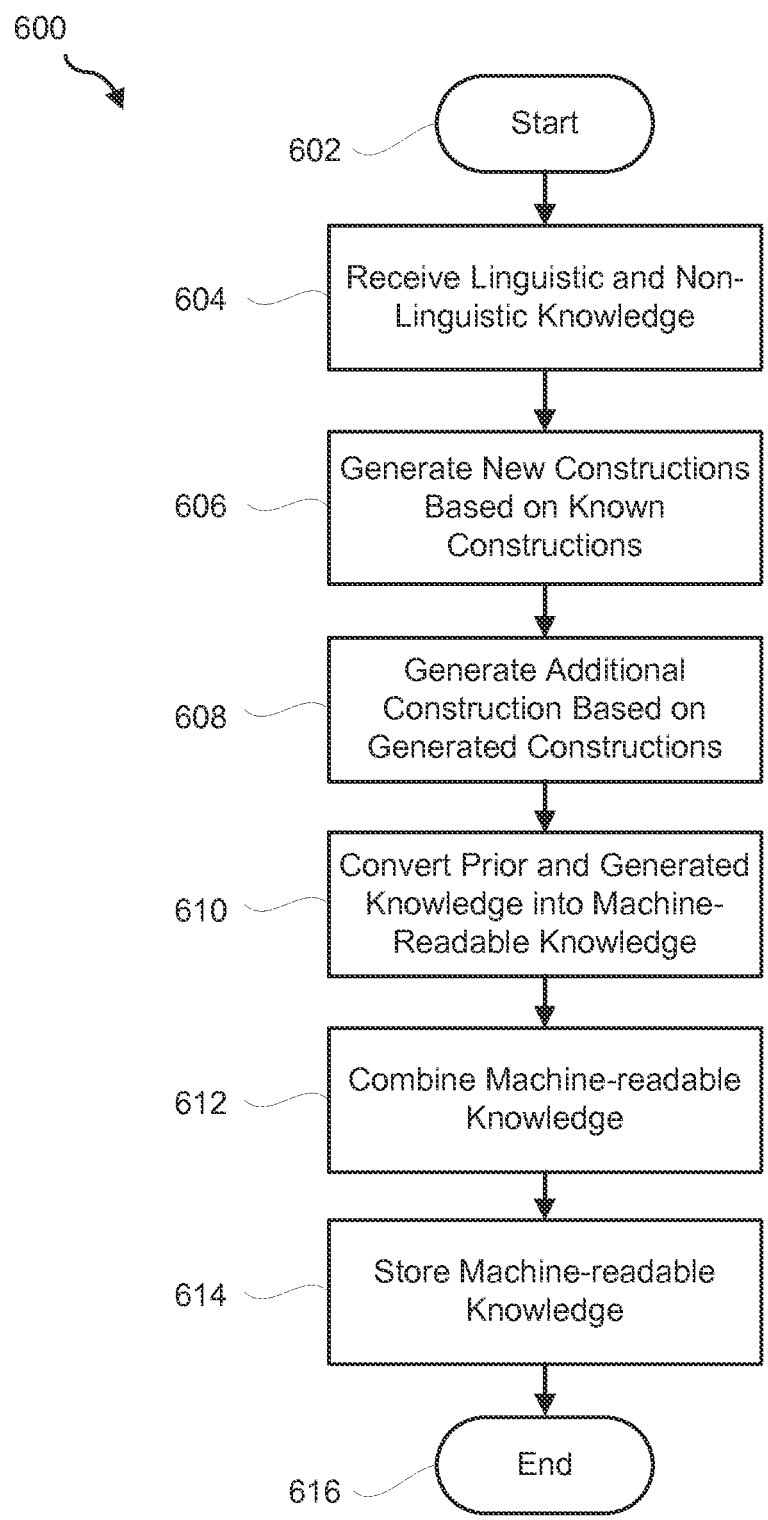
FIG. 6 is an exemplary diagram of a method for generating machine-readable knowledge in accordance with some embodiments of the present disclosure.

FIG. 6 is an exemplary diagram of a method 600 for generating machine-readable knowledge in accordance with some embodiments of the present disclosure. In some embodiments, the method 600 may be implemented by compiler 1060 of FIG. 10. The machine-readable knowledge may be in a form different from that of a user input for use when analyzing new user inputs. In some examples, the machine-readable knowledge may be one, or a combination of, production rules, logical formulae, probabilistic graphical models, correlation matrices, frames, scripts, attribute value pairs, petri nets, support vector machines, constraint graphs, and weighted, probabilistic and/or logical constraints. At step 602, the process may begin. At step 604, linguistic and non-linguistic knowledge or data may be received and/or accessed. At step 606, new constructions may be generated based on the linguistic and non-linguistic knowledge or data received at step 604. At step 608, additional constructions may be generated based on known constructions including the newly generated constructions. At step 610, the prior and generated knowledge may be converted to machine-readable knowledge. At step 612, the machine-readable knowledge may be combined. At step 614, the machine-readable knowledge may be stored and the process may end at step 616.

Referring to step 604, linguistic and non-linguistic knowledge or data may be received and/or accessed. In some embodiments, the linguistic and non-linguistic knowledge or data may be part of the information stored in the agent module 300 and/or the constructions generated by method 700 during step 510. After the linguistic and non-linguistic knowledge or data have been received and/or accessed, the process may proceed to step 606.

Referring to step 606, new constructions may be generated based on known constructions included in the linguistic knowledge. In some embodiments, the known constructions may be stored in the agent module 300. The new constructions may be generated according to common variations within the input language. In some embodiments, the new constructions also may be generated according to a generative construction process described in further detail below with respect to FIG. 7.

In one example, a known construction in the agent module 300 may be "PERSON devour FOOD." Based on the known construction with the syntactic form "PERSON devour FOOD," additional constructions may be generated for other syntactic forms. For instance, "FOOD devoured by PERSON," "FOOD that PERSON devoured," "PERSON devouring FOOD," "devourer," and "devouring" may be generated. After the new constructions have been generated, the process may proceed to step 608.

Referring to step 608, additional constructions may be generated based on constructions generated in 606. The additional constructions generated may then themselves be used to generate more constructions, and so on. The additional constructions may be generated according to a compositional phrase generation process described in further detail below with respect to FIG. 8. For example, the construction for "PERSON sent MESSAGE" (e.g., "John sent the email") and "send TIME" (e.g., "sent yesterday") may be combined into a construction whose syntactic form is "PERSON send MESSAGE TIME" (e.g., "John sent the email yesterday"). The generated constructions may be part of overall generated knowledge to be converted at step 610. After the additional constructions have been generated, the process may proceed to step 610.

Referring to step 610, the prior and generated knowledge may be converted into machine-readable knowledge suitable for the computational methods of the language analyzer. In some embodiments, the prior and generated knowledge may be analyzed by a first-order logic reasoner, weighted constraint satisfier, probabilistic reasoner, neural network, and/or frame system such that the constructions are converted into a logical formulae, schema, weighted constrains, graphical model, connection matrices, and/or frame set. After the prior and generated knowledge have been converted into appropriate machine-readable knowledge, the process may proceed to step 612.

Referring to step 612, the machine-readable knowledge generated at step 610 may be combined with machine-readable knowledge generated from constructions and lexemes common to most or all agents using the same language. For example, natural language interfaces in many domains involving language about time (e.g., "the movie tomorrow" or "the meeting yesterday"). As additional examples, the common constructions may pertain to quantifying expressions (e.g., "eight", "many", "several", "all"), interrogative forms (e.g., "which", "how many", "is", "who did"), coordination (e.g., "and", "or", "but"), negation (e.g., "not", "never"), conditional expressions (e.g., "if . . . then . . . ," "whenever . . . , do . . . "), temporal expressions (e.g., "last year", "May 24"), subordinate clauses (e.g., "the X that Y"), widely known proper names (e.g., "Napoleon", "Isaac Newton"), auxiliary verbs (e.g., "is", "can", "would"), prepositions (e.g., "from", "by"), pronouns (e.g., "she", "they"), determiners (e.g., "a", "the", "some") etc. Machine-readable knowledge arriving from constructions and lexemes for this common language therefore may be included in this step. After the machine-readable knowledge has been combined, the process may proceed to step 614.

Referring to step 614, the machine-readable knowledge from step 612 may be stored. After the machine-readable knowledge has been stored, the process may proceed to step 616.

Figure 7:
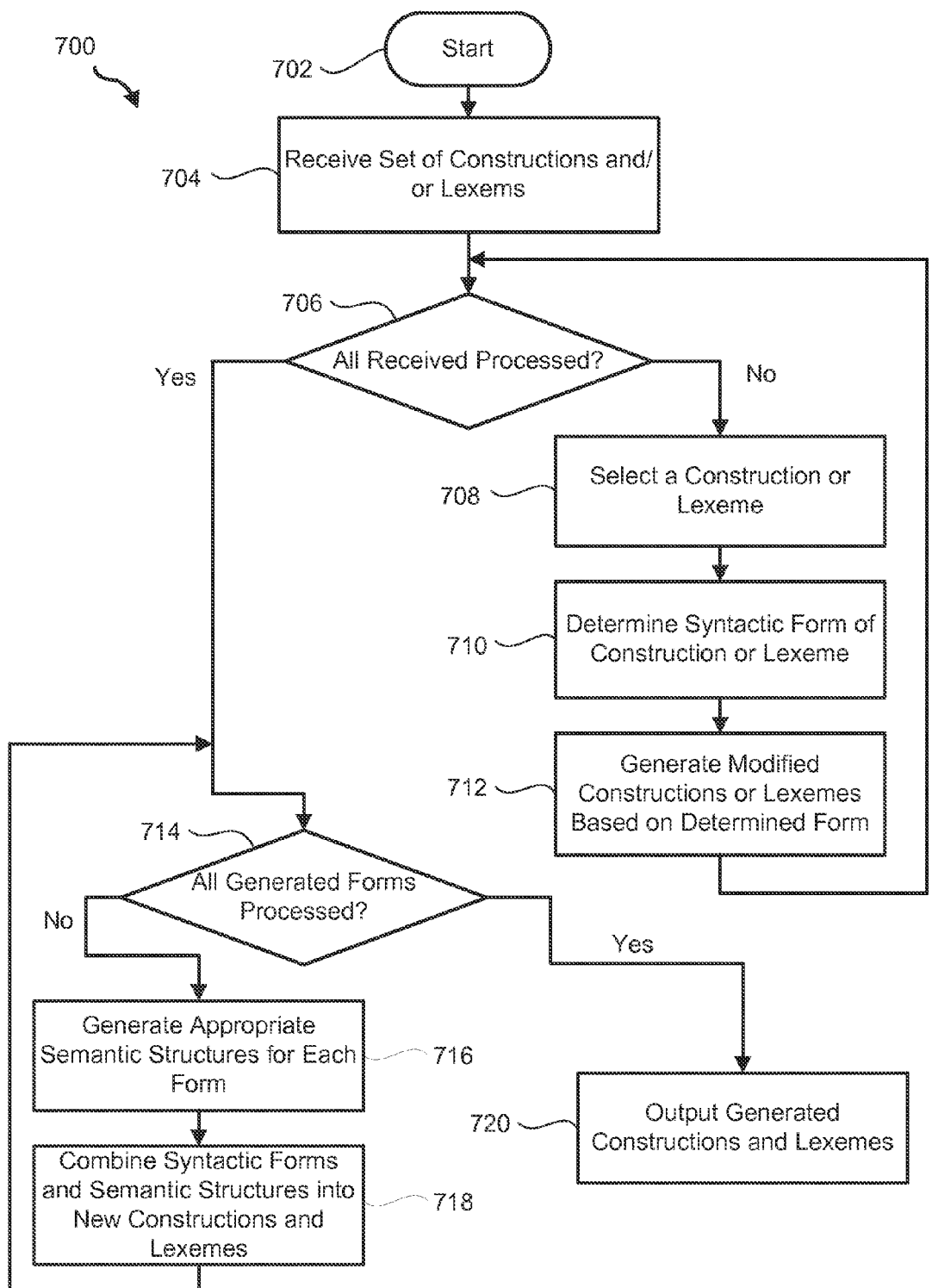
FIG. 7 is an exemplary diagram of a method for generating constructions in accordance with some embodiments of the present disclosure.

FIG. 7 is an exemplary diagram of a method 700 for generating constructions and lexemes in accordance with some embodiments. In some embodiments, the method 700 may be referred to as a construction generation process. Additionally, the method 700 may be implemented during processing of a user input at step 510 or during the compiling of an agent module at steps 606 and 608. At step 702, the process may begin. At step 704, constructions and/or lexemes may be received. At step 706, it may be determined whether all of the received items have been processed. At step 708, one of the received constructions or lexemes may be selected. At step 710, the syntactic form of a construction or lexeme may be determined. At step 712, a modified construction or lexeme may be generated for the selected item and the process may proceed back to step 706. At step 714, it may be determined whether all of the generated syntactic forms have been processed. At step 716, appropriate semantic structures for the newly generated syntactic forms may be generated. At step 718, the newly generated syntactic forms and the newly generated semantic structures may be combined. At step 720, the newly generated constructions and lexemes may be output.

Referring to step 704, a set of constructions and/or lexemes may be received. In some embodiments, the received construction and/or lexemes may be part of the agent module used for analyzing language, described in FIG. 5. In additional embodiments, the received constructions may be constructions received at step 606 and 608. In at least one embodiment, multiple constructions may be received at step 704. After at least one item has been received, the process may proceed to step 706.

Referring to step 706, it may be determined whether each of the received constructions and lexemes have been processed. If it has been determined that they have all been processed and analyzed, the overall process may proceed to step 708. However, if it is determined that all of the received items have been processed and analyzed, the overall process may proceed to step 714.

Referring to step 708, one of the received constructions that has not been analyzed may be selected. For example, when there are multiple constructions received at step 704, it may be determined which of the constructions have not been processed and one of the unanalyzed constructions may be selected. After an unanalyzed construction has been selected, the process may proceed to step 710.

Referring to step 710, the syntactic form of the construction 322 or lexeme 312 may be determined. After the form of the construction has been determined, the process may proceed to step 712.

Referring to step 712, a syntactic form may be generated from the syntactic form received in step 710. This form may be generated on the basis of linguistic regularities within a language that license one syntactic form on the basis of another. In some embodiments, if it is determined the syntactic form is that of a verb, additional syntactic forms may be generated. For example, if the selected construction is "X bake Y," it may be determined that the syntactic form is a verb and "baker," "X baked Y," "Y baked by X," "Y that was baked by X," "Y not bake X," "X is baking Y," "X bakes," "X unbake Y," "X rebake Y," and any additional appropriate constructions may be created. In another example, the selected construction may be "pizza" and determined to be a noun such that a plural form of the noun, "pizzas," may be generated. This process may occur for all parts of speech. After the modified syntactic forms have been generated, the process may proceed back to step 706.

Referring to step 714, it may be determined whether each of the construction forms have been processed. If it has been determined that all of the construction forms have not been processed and analyzed, the overall process may proceed to step 716. However, if it is determined that all of the received constructions have been processed and analyzed, the overall process may proceed to step 720.

Referring to step 716, semantic representations for each construction form may be generated. In one example, the semantic representation generated for the modified construction "baked" may indicate that the "bake" event occurred in the past. After the semantic representations have been generated for each of the construction forms, the process may proceed to step 718.

Referring to step 718, the semantic structures 314 or 324 generated at step 716 may be combined with the corresponding newly generated syntactic forms from step 712. After the semantic representations and the new constructions have been combined to form a lexeme or construction, the process may proceed back to step 714.

Referring to step 720, the new constructions and lexemes may be output. In some embodiments, the combined constructions and semantic representations may be output to a database and stored.

Figure 8:
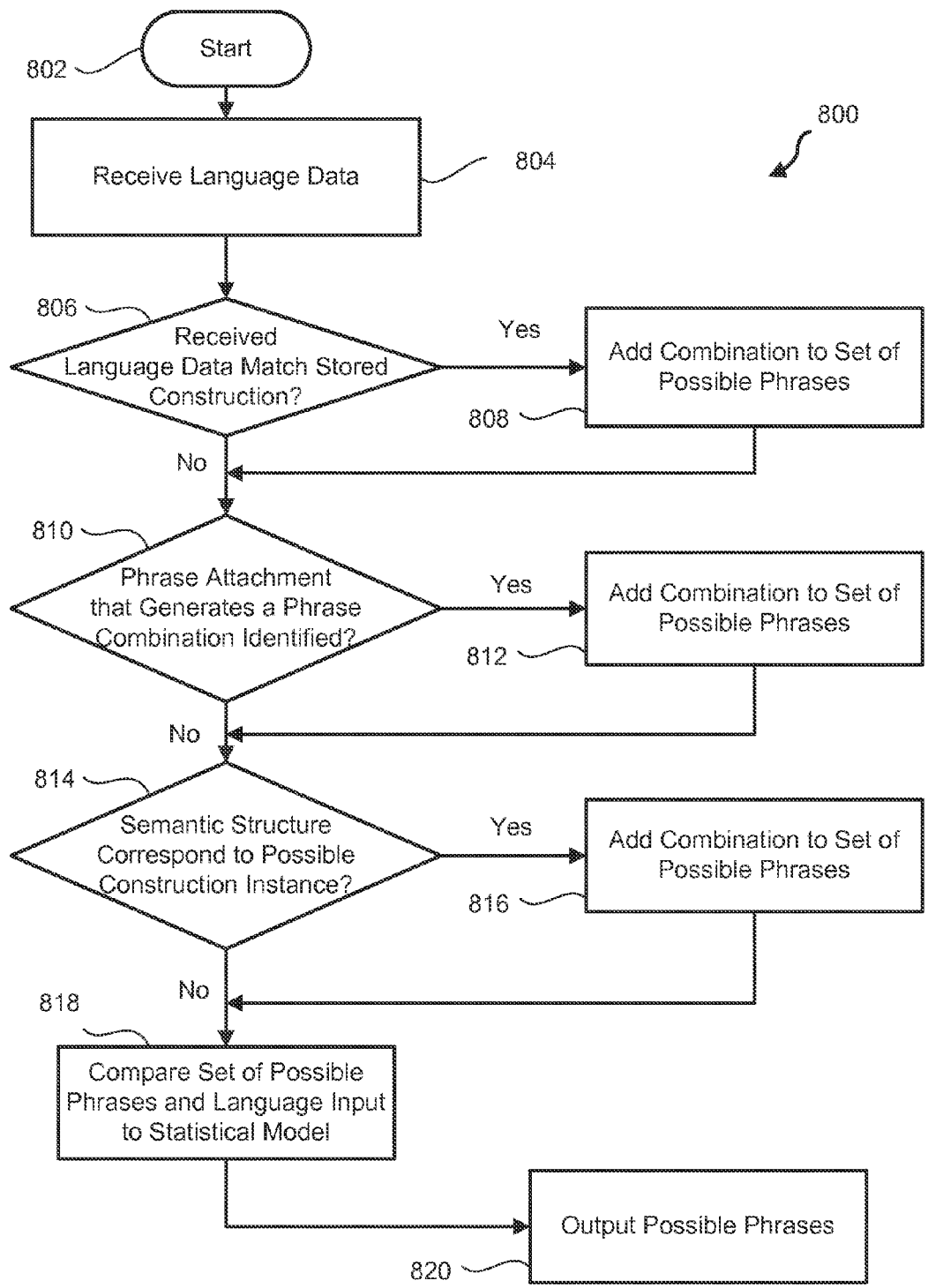
FIG. 8 is an exemplary diagram of a method for employing a compositional process to generate phrases in accordance with some embodiments of the present disclosure.

FIG. 8 is an exemplary diagram of a method 800 for generating phrases composed of other phrases and words in accordance with some embodiments. At step 802, the process may begin. At step 804, relevant language data may be received. At step 806, the received language data may be compared to stored constructions to determine if there is a match. At step 808, a matching construction may be added to a set of construction matches. At step 810, it may be determined whether a phrase association (generated for example, by binding, attachment or co-reference) identifies a phrase combination. At step 812, a matching construction may be added to the set of construction matches. At step 814, it may be determined whether a semantic structure corresponds to a possible construction. At step 816, a matching construction may be added to the set of construction matches. At step 818, phrases may be created based on a statistical model. At step 822, new possible compositional phrases may be output.

Referring to step 804, relevant language data may be received. In some embodiments, the language data may include all of the information stored in the agent module 300, a portion of the user input, and any previous processing performed on the user input. In one example, the received data may include the fact that a substring "pizza Fred ordered" refers to an object of type pizza such that Fred ordered the pizza. This input may also include the constructions that generated the phrase and its corresponding semantic structure. In this example, such a construction could have syntactic form "FOOD PERSON ordered." After the relevant language data may be received, the process may proceed to step 806.

Referring to step 806, the received language data may be compared to stored constructions to determine if there is a match. For example, the received language data may include a string of a user input, "Bob devoured the pizza Fred ordered," where "Bob" was previously determined to refer to an object of type PERSON and "pizza Fred ordered" was previously determined to refer to an object of type FOOD. In this example, it may be further determined that the string "Bob devoured pizza" matches the "PERSON devour FOOD" construction. If the received language data has been determined to match a stored construction, the process may proceed to step 808. However, if it is determined that the received language data does not match a stored construction, the process may proceed to step 810. As described above with respect to step 512, the match to constructions does not need to be exact.

Referring to step 808, the matching construction identified at step 806 may be added to a set of possible phrases or construction matches. In the above-noted example, the matching construction "PERSON devour FOOD" may be added to the set of possible phrases or constructions. After the matching construction has been added to the set of possible phrases or construction matches, the process may proceed to step 810.

Referring to step 810, it may be determined whether a phrase attachment that generates a phrase combination has been identified. In one example, the received data may include the phrase "he devoured pizza" instead of "Bob devoured pizza" and it may have been previously determined that "pizza" referred to an object of type FOOD and "he" referred to "John Doe." Further, at step 806, it may be determined that since "he" is not of a type "PERSON," the construction "PERSON devour FOOD" does not match. At step 810, it may be determined that "he" is "bound to" "John Doe" and because John Doe is a PERSON, the "PERSON devour FOOD" construction does match.

In another example, the phrase attachment may be generated by long-distance dependencies. For example, in "the man John saw Fred greet," "Fred greet" and "the man" could together match a "PERSON1 greet PERSON2" even though "the man" is distant in the input from the word "greet." Additionally, attachments may be generated by a process of ellipsis resolution. For example, in "John likes ice cream, and so does Mary," "so does Mary" could match a "PERSON likes FOOD" analysis in an ellipsis resolution process which determines that "likes ice cream" is being indicated by "so does." In a further example, the attachment could be generated by elements that were not directly included in an input, but instead inferred on the basis of information in the agent module. For example, the input "the New York office called" may match the "PERSON called" construction if some process determines that "New York" refers to a person in a New York office.

In yet another example, attachments could be created using case, gender, number or other characteristics of words. For instance, the input "him she greeted" could be determined to infer that a female greeted male because "she" (as opposed to "her") is normally the subject in English and "him" (as opposed to "he") is normally an object. If a phrase attachment that generates a phrase combination has been identified, the process may proceed to step 812. However, if a phrase association that generates a phrase combination has not been identified, the process may proceed to step 814.

Referring to step 812, the identified phrase association that generates a phrase combination from step 810 may be added to the set of possible phrases or constructions. In the above-noted example, the combination of the construction "PERSON devour FOOD," together with some indication that "Bob" is substituted for "PERSON" and that "pizza" is substituted for FOOD, may be added to the set of possible construction matches. After a match has been added to the set of possible matches, the process may proceed to step 814.

Referring to step 814, a semantic structure of the received language data may be analyzed to determine if it corresponds to a construction. For example, if the construction received at step 804 was "John met the man at the park that devoured the pizza," it may be unclear whether "the park" devoured the pizza or whether "the man" devoured the pizza since both would be grammatically correct. However, at step 814, the semantic structure of the construction may be analyzed to determine if it corresponds to a possible construction instance. In this example, the construction where "the man" devoured "the pizza" may be chosen since only animals devour things and because "the park" is not of an object type "ANIMAL." In some embodiments, the check for correspondence to a construction may occur using logical reasoning, analogical matching, statistical inference, production rule matching, neural networks and/or any other form of computation. After the semantic structure of the received language data is analyzed, the process may proceed to step 816.

Referring to step 816, the identified construction from step 814 may be added to the set of possible phrases or constructions. After construction has been added to the set of possible phrases or construction matches, the process may proceed to step 818.

Referring to step 818, the set of possible phrases and the language input may be analyzed using statistical models in order to determine which phrases and/or words can combine with each other into a phrase, and to attempt to determine which specific combinations were intended by the user. In some embodiments, based on the analysis of the set of possible phrases, the language input, and the statistical models, one of the possible phrases in the set of possible phrases may be removed. For example, the input may include the phrase "Spot devoured the pizza" where "Spot" refers to a dog. In this example, at step 818, the match to the construction "PERSON devoured PIZZA" may be removed since it is a statistical fact that dogs do not often eat pizza. In another example, if the input was "the man devoured the pizza," the construction "PERSON devoured PIZZA" may be added to the set of possible phrases or constructions because people are more likely to eat pizza. After the set of possible phrases and the language input have been compared to the statistical models, the process may proceed to step 820.

Referring to step 820, the set of possible phrases or constructions may be output.

Figure 9:
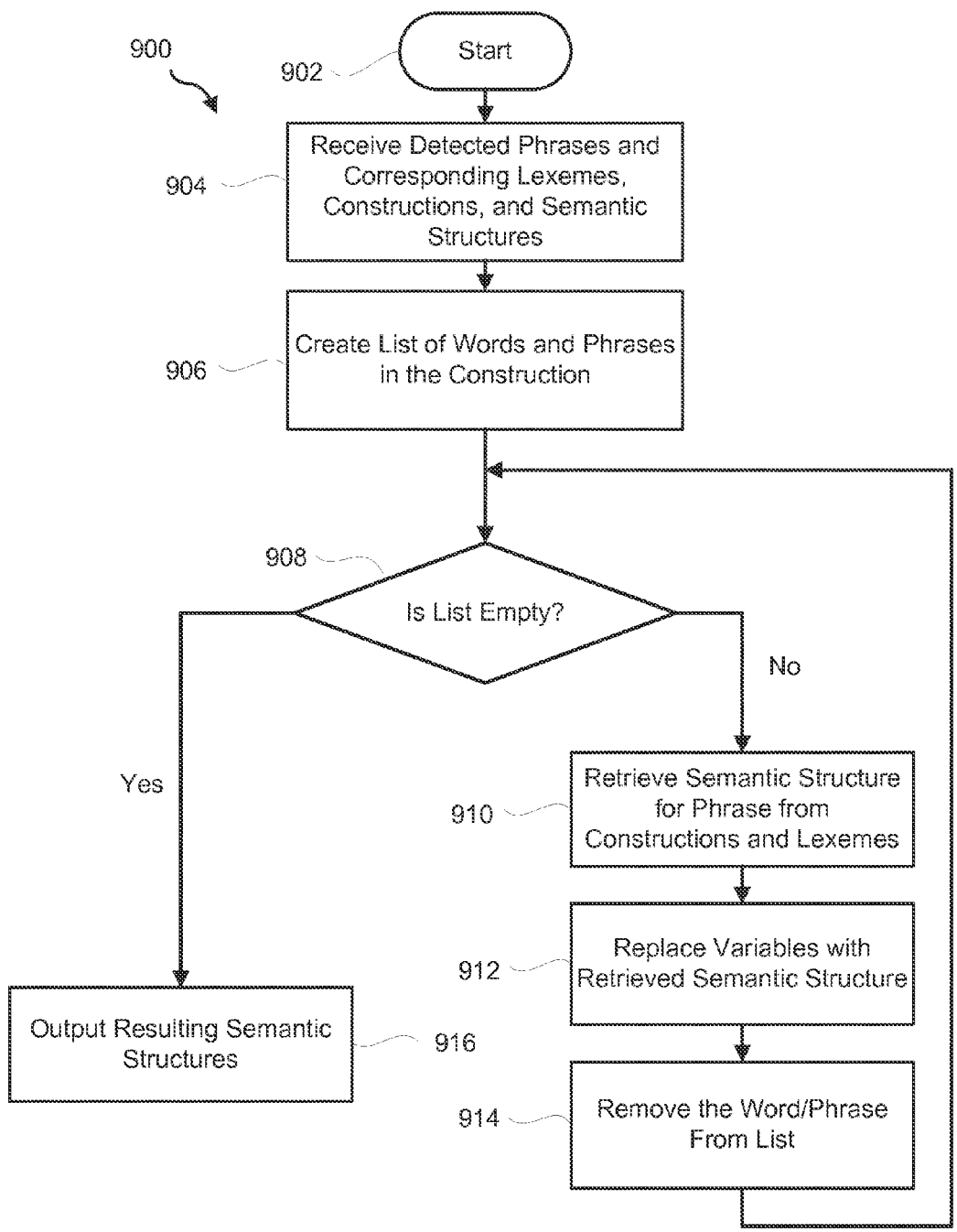
FIG. 9 is an exemplary diagram of a method for constructing compositional semantic structures in accordance with some embodiments of the present disclosure.

FIG. 9 is an exemplary diagram of a method 900 for composing semantic structures in accordance with some embodiments. At step 902, the process may begin. At step 904, the newly directed constructions and corresponding semantic structures may be received. At step 906, a list of words and phrases in the construction may be created. At step 908, it may be determined whether the list of words and phrases is empty. At step 910, a semantic structure of one of the words or phrases in the list may be retrieved from the list. At step 912, the retrieved semantic structure for the word or phrase may be replaced in the semantic structure of the construction. At step 914, the word or phrase may be removed from the list. At step 916, the resulting constructions may be output.

Referring to step 904, newly detected phrases, the constructions or lexemes that generated them, and the semantic structures that resulted are received. In one embodiment, an instance of the construction with semantic form "Find X" may have been detected such that the linguistic input that generated this instance was "Find the pizza Bob ordered." Part of the information received at this step may also include the construction with syntactic form "PERSON ordered FOOD" together with the semantic structure this construction generated for this input: "Past(Order(Bob,Food))." After the newly detected constructions and semantic structures have been received, the process may proceed to step 906.

Referring to step 906, a list of words and phrases included in the newly detected construction may be created. In the previous example, this list would be "find the pizza that Bob ordered." After the list of words and phrases has been created, the process may proceed to step 908.

Referring to step 908, it may be determined whether the list of words and phrases created at step 906 is empty. If it is determined that the list of words is not empty, then the process may proceed to step 910. However, if it is determined that the list of words is empty, then the process may proceed to step 916.

Referring to step 910, a semantic structure of a word or phrase included in the list of words and phrases may be retrieved. In one example, the semantic structure generated for "the pizza that bob ordered" (e.g., {Pizza: Past(Order(Bob,Pizza))}) may be retrieved. After the semantic structure of the word or phrase has been retrieved, the process may proceed to step 912.

Referring to step 912, the semantic structure of the word or phrase retrieved at step 910 may be replaced in the semantic structure of the word or phrase. In the previous example, the semantic structure for the "find X" construction may be Find (X). In this step, the words "the pizza that Bob ordered" correspond to X, and therefore the semantic structure for those words would be replaced to generate: Find({pizza:Past (Order(Bob,Pizza))}). After this replacement, the process may proceed to step 914.

Referring to step 914, the word or phrase which has had its semantic structure replaced at step 912 may be removed from the list of words and phrases created at step 906. In the above-noted example, the list of input "find the pizza ordered by Bob" may have the substring "the pizza ordered by Bob" removed because the semantic structure for that phrase has been processed. After the word or phrase has been removed, the process may proceed back to step 908.

Referring to step 916, the resulting semantic structures may be output when it is determined that the list of words and phrases is empty.

Figure 10:
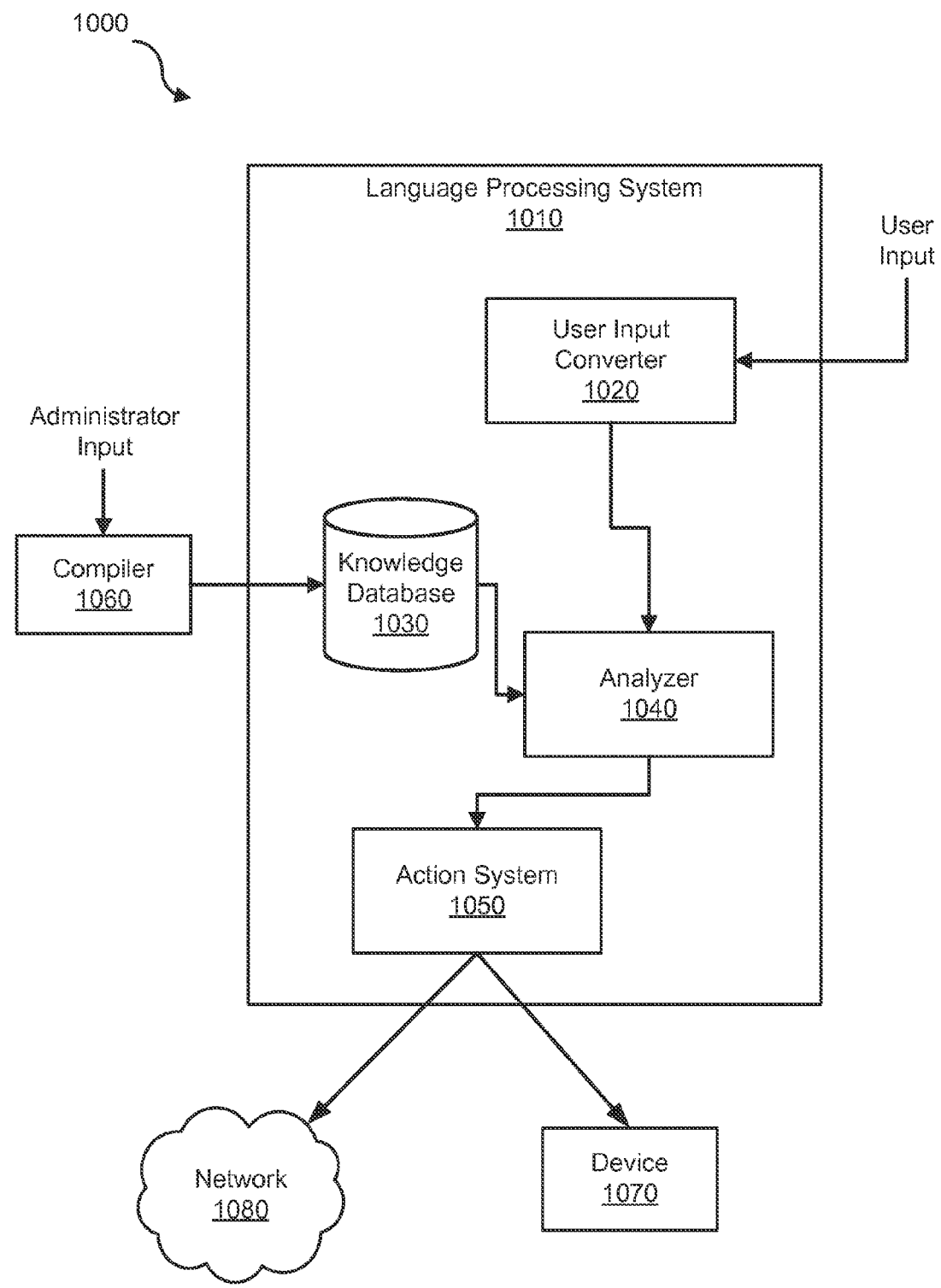
FIG. 10 is an exemplary diagram of a language processing system in accordance with some embodiments of the present disclosure.

FIG. 10 shows a language processing system 1000 in accordance with an embodiment of the present disclosure. As illustrated, language processing system 1000 may contain one or more components including a language processing system 1010, a complier 1060, a device 170, and a network 1080.

Referring to the block 1010, language processing system 1010 may include a user input converter 1020, a knowledge database 1030, an analyzer 1040, and an action system 1050.

Referring to the block 1020, user input converter 1020 may receive a user input and convert it into an appropriate form for processing. For example, user input converter 1020 may be configured to optically recognize characters (OCR), to recognize gestures, to recognize speech, or to recognize handwriting. In another example, user input converter 1020 may be configured to receive an analog signal via a keyboard or mouse and convert that signal or input into an appropriate form for processing by analyzer 1040.

Referring to the block 1030, knowledge database 1030 may store data for use by analyzer 1040 when processing the user input converted by the user input converter 1020. In some embodiments, knowledge database 1030 may store relevant language data. For example, the relevant language data may include a list of words in a plurality of languages, associated semantic structures for each of the words, and statistical information for the plurality of languages, commonly occurring fragments of syntactic structure (e.g., tree banks), and databases of locations, people, name, relationships, attributes, and objects. The knowledge database 1030 may also include the information stored in the agent module, either in the data structures used in the agent module, or using data structures derived from or associated with these.

Referring to the block 1040, analyzer 1040 may be configured to perform the method 400 for analyzing the text-possibility representation and converting it into at least one semantic structure representation as shown in FIG. 5.

Referring to the block 1050, action system 1050 may be configured to perform the appropriate action based on the result of the user input analysis performed by analyzer 1040. For example, action system 1050 cause a call to be placed on a client, a contact to be added to a list of contacts, or a webpage search to be performed. In one example, the user input can be "tell me when Bob logs on." After the analyzer determines the meaning of this input, the action system may perform the necessary actions to comply with this command. For example, the system may repeatedly check a website for changes to Bob's login status and send an email to the user when that status changes from Bob not being logged on to Bob being logged on.

Referring to the block 1060, compiler 1060 may execute method 600 for generating machine-readable knowledge as shown in FIG. 6. In some embodiments, compiler 1060 may receive an administrator input, generate data based on the input, and store the data in knowledge database 1030 for use by analyzer 1040.

Referring to the block 1070, device 1070 may be an appropriate device configured to implement an action determined by analyzer 1040 and executed by action system 1050. In some embodiments, device 1070 may be a computer, a smartphone, a tablet, or any other appropriate device for implementing the determined action to be performed. Additionally, device 1070 may correspond to clients 110-130 shown in FIG. 1.

Referring to the block 1080, network 1080 may be a network that connects language processing system 1010 with additional devices, databases, or computers. Network 1080 may also correspond to network 150 shown in FIG. 1.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both microprocessors and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices); magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device (e.g., a mouse or a trackball), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for analyzing a linguistic input comprising, at a computing device:
receiving the linguistic input, the linguistic input comprising at least one word;
accessing prestored language data for a language corresponding to the linguistic input;
converting the linguistic input into a text possibility based on the received language data;
determining a meaning of the text possibility based on the prestored language data, including:
selecting a subset of the text possibility, and
generating at least one new language construction and/or lexeme based on the subset of the text possibility;
generating at least one semantic structure corresponding to the determined meaning; and
determining an action to perform based on the generated at least one semantic structure.

2. The method of claim 1, wherein the prestored language data includes language constructions and lexemes.

3. The method of claim 2, wherein the language constructions and lexemes associate text patterns with corresponding meanings.

4. The method of claim 1, wherein converting the linguistic input into the text possibility includes determining whether the linguistic input is ambiguous based on the prestored language data.

5. The method of claim 1, further comprising:
receiving a user input; and
converting the user input into the linguistic input,
wherein the linguistic input is converted into the text possibility based on at least one of handwriting recognition, speech recognition, optical character recognition, and a gesture based user interface.

6. A method for analyzing a linguistic input comprising, at a computing device:
receiving the linguistic input, the linguistic input comprising at least one word;
accessing prestored language data for a language corresponding to the linguistic input;
converting the linguistic input into a text possibility based on the received language data;
determining a meaning of the text possibility based on the prestored language data, including:
selecting a subset of the text possibility;
generating at least one new language construction and at least one new lexeme based on the subset of the text possibility;
identifying a known language construction that matches the at least one new language construction;
combining the known language construction that matches the subset of the text possibility with another language construction to generate a meaning possibility;
generating a semantic structure for the meaning possibility of the text possibility;
modifying the semantic structure for the meaning possibility based on the prestored language data; and
determining the action to perform based on the modified semantic structure for the meaning possibility.

7. The method of claim 6, wherein generating at least one new language construction is based on common linguistic properties included in the prestored language data.

8. The method of claim 7, wherein identifying the known language construction that matches the at least one new language construction is based on the common linguistic properties.

9. The method of claim 6, wherein generating the meaning possibility comprises identifying a grammatical form of the subset.

10. The method of claim 9, wherein generating the meaning possibility comprises determining whether the subset is ambiguous and removing the ambiguity based on at least one of known language semantics, language statistics, and language taxonomy.

11. The method of claim 10, wherein the ambiguity is related to at least one of the grammatical form of the subset, a phrase attachment to the subset, a semantic type of part of the subset, and a pronoun binding in the subset.

12. The method of claim 9, wherein the grammatical form comprises at least one of a word type and a phrase type, wherein each of the word type or the phrase type is constrained in at least one of a grammatical category, semantic category, morphological structure, and phonological structure of input.

13. The method of claim 6, wherein generating the meaning possibility is based on at least one of the combined language constructions, a pronoun binding in the subset, a conjunction in the subset, and an ellipsis in the subset.

14. The method of claim 6, wherein the subset comprises at least one word.

15. The method of claim 1, wherein the linguistic input comprises an input convertible to text including one of a textual input, handwritten, gestural, and a spoken input.

16. The method of claim 1, wherein the prestored language data includes at least one of word semantics, phrase semantics, linguistic statistics, world knowledge, and linguistic taxonomy.

17. The method of claim 1, wherein the determined action is at least one of performing an internet search, composing a message, creating a contact, interacting with software, manipulating, retrieving or storing data producing computer code, interacting with software through APIs, querying or modifying one or more databases, and placing a telephone call.

18. The method of claim 1, wherein the linguistic input is received from a device and the determined action is performed at one of the device and a separate device.

19. At least one non-transitory processor readable storage medium storing a computer program of instructions configured to be readable by at least one processor for instructing the at least one processor to execute a computer process for performing the method as recited in claim 1.

20. A method for analyzing a linguistic input comprising, at a computing device:
accessing prestored data, the prestored data containing at least one of language constructions, lexemes, world knowledge, statistical regularities, and contextual information;
generating a new language construction and lexeme based on the prestored data;
generating an additional language construction and lexeme based on a combination of prior language constructions and lexemes;
converting the prestored data into a different format;
storing the converted data in the different format;
receiving the linguistic input, the linguistic input comprising at least one word;
converting the linguistic input into a text possibility based on the converted data comprising the new and additional language constructions and lexemes;
determining a meaning of the text possibility based on the converted data;

generating at least one semantic structure corresponding to the determined meaning; and determining an action to perform based on the generated at least one semantic structure.

21. The method of claim 20, wherein each of the language constructions and lexemes include at least one word type paired with a semantic structure, the word type comprising at least one of syntactic and semantic information.

22. The method of claim 20, wherein the prestored data includes at least one of categories of linguistic and nonlinguistic data, word associations, world knowledge, linguistic knowledge, statistical regularities, and an analog signal to text-possibility representation conversion module.

23. The method of claim 20, wherein generating the new language construction and lexeme comprises:

selecting one of the plurality of prestored language constructions and/or lexemes;

determining a syntactic form of the selected construction;

generating a new syntactic form based on the form of the selected construction; and generating a new semantic structure based on the selected construction and the generated syntactic form.

24. The method of claim 23, wherein the syntactic form of the selected constructions or lexemes comprises at least one of a word type and a phrase type that is constrained in at least one of a grammatical category, semantic category, morphological structure, and phonological structure of input.

25. The method of claim 23, wherein generating the new language construction further comprises:

generating a semantic representation for the generated new syntactic form; and combining the generated new syntactic form and the semantic representation to form the new language construction.

26. The method of claim 20, wherein generating the additional language construction is based on a determination of whether one or more prior language constructions or lexemes together match one of the plurality of prestored language constructions and lexemes.

27. The method of claim 20, wherein determining a possible syntactic structure and semantic structure of the linguistic input is based on a computational process utilizing an interrelationship between the prestored language constructions, lexemes, world knowledge, statistical regularities, and contextual information.

28. A system for analyzing a linguistic input comprising:
one or more processors communicatively coupled to a network; wherein the one or more processors are configured to:

receive the linguistic input, the linguistic input comprising at least one word;

access prestored language data for a language corresponding to the linguistic input;

convert the linguistic input into a text possibility based on the received language data;

determine a meaning of the text possibility based on the prestored language data;

generate at least one semantic structure corresponding to the determined meaning;

generate a new language construction and/or lexeme based on the text possibilty; and determine an action to perform based on the generated at least one semantic structure.

29. A system for analyzing a linguistic input comprising:
one or more processors communicatively coupled to a network; wherein the one or more processors are configured to:

access prestored data, the prestored data containing at least one of language constructions, lexemes, world knowledge, statistical regularities, and contextual information;

generate a new language construction and lexeme based on the prestored data;

generate an additional language construction and lexeme based on a combination of prior language constructions and lexemes;

convert the prestored data into a different format;

store the converted data in the different format;

receive the linguistic input, the linguistic input comprising at least one word;

convert the linguistic input into a text possibility based on the converted data comprising the new and additional language constructions and lexemes;

determine a meaning of the text possibility based on the converted data;

generate at least one semantic structure corresponding to the determined meaning; and determine an action to perform based on the generated at least one semantic structure.

* * * * *